United States Patent
Kraemling et al.

(10) Patent No.: US 7,326,454 B2
(45) Date of Patent: Feb. 5, 2008

(54) LAMINATED GLASS WITH EMBRITTLED ZONE

(75) Inventors: Franz Kraemling, Aachen (DE); Dieter Linnhoefer, Stolberg (DE)

(73) Assignee: Saint-Gobain Glass France, Courbevoie (FR)

( * ) Notice: Subject to any disclaimer, the term of this patent is extended or adjusted under 35 U.S.C. 154(b) by 188 days.

(21) Appl. No.: 10/515,348

(22) PCT Filed: Jun. 4, 2003

(86) PCT No.: PCT/FR03/01673

§ 371 (c)(1),
(2), (4) Date: Apr. 13, 2005

(87) PCT Pub. No.: WO03/103952

PCT Pub. Date: Dec. 18, 2003

(65) Prior Publication Data

US 2005/0175844 A1 Aug. 11, 2005

(30) Foreign Application Priority Data

Jun. 10, 2002 (DE) ............................ 102 25 555

(51) Int. Cl.
*B32B 17/00* (2006.01)
(52) U.S. Cl. ........................... 428/43; 428/410
(58) Field of Classification Search ............. 428/43, 428/410; 65/115
See application file for complete search history.

(56) References Cited

U.S. PATENT DOCUMENTS

| 3,427,770 | A | * | 2/1969 | Kunert et al. ............ 52/203 |
| 3,592,726 | A | | 7/1971 | Blizard |
| 3,822,122 | A | | 7/1974 | Baudin et al. |
| 5,189,952 | A | | 3/1993 | Ohmura et al. |
| 5,380,575 | A | * | 1/1995 | Kuster et al. ............ 428/98 |

FOREIGN PATENT DOCUMENTS

| EP | 0 560 639 | | 9/1993 |
| FR | 1 425 292 | | 1/1966 |
| FR | 2 160 877 | | 7/1973 |
| FR | 2 395 163 | | 1/1979 |
| GB | 1407804 | * | 9/1975 |
| GB | 2 019 777 | | 11/1979 |

* cited by examiner

*Primary Examiner*—Alexander S. Thomas
(74) *Attorney, Agent, or Firm*—Oblon, Spivak, McClelland, Maier & Neustadt, P.C.

(57) ABSTRACT

A composite pane having at least one weak point for closing a vehicle opening, which includes at least one glass pane and at least one further pane, and an intermediate layer that connects the at least one glass pane and the at least one further pane to one another. The glass pane is provided with one or more weak points such that, in an event of an object striking the composite pane, the glass pane breaks at the one or more weak points, but the vehicle opening still remains closed at least by deforming the intermediate layer of the composite pane.

13 Claims, No Drawings

LAMINATED GLASS WITH EMBRITTLED ZONE

The invention relates to a composite pane with weak points for closing a vehicle opening. The invention likewise relates to the use of a composite pane according to the invention in a vehicle.

Widely differing embodiments of composite panes are used, mainly as transparent windows, in vehicles and buildings. The particular advantage of composite panes is regarded as being that they combine safety characteristics with a high rupture strength. The safety characteristics are based on the fact that, when the composite panes are destroyed, the broken-up individual panes are held together with the aid of the tear-resistant intermediate layer which connects the panes. Furthermore, no sharp edges project out of the composite pane. The rupture strength of composite panes is in this case considerably greater than that of individual panes of the same thickness or of a prestressed individual pane. Prestressed panes also additionally have the disadvantage that they are sensitive to edge and surface damage and can break when such damage occurs. A further advantage of composite panes is that they can be equipped with additional functional elements, which are arranged in a protected form within the composite pane. This means that the functional elements, for example transparent thin layers or electrical conductors, are arranged either in or on the intermediate layers, or on an internal pane surface.

The stated advantages relating to the rupture strength of composite panes may have a disadvantageous effect if, in the event of an emergency, an area which is separated by a pane such as this has to be exited from or entered. Composite panes can be ruptured only with special tools.

In order to solve this problem, composite panes with weak points have been developed, which are used as emergency exit or entry systems. Composite safety glass panes with an emergency exit system are known, for example, from DE 44 28 690 A1 and from U.S. Pat. No. 5,350,613. Composite safety glass panes such as these are formed from at least two rigid panes with a polymer intermediate layer, with the intermediate layer containing a weak point. The weak point described in DE 44 28 690 A1 is represented by a local weakened area in the intermediate polymer layer. This is achieved by reducing the adhesion of the layer to the glass, or else between different sheets of the layer.

German Patent DE 100 45 006 C1 describes a composite safety glass pane with a weak point, which contains prestressed glass panes and a polymer intermediate layer, which is interrupted at at least one point. In this case, the polymer intermediate layer is composed of two transparent plastics with different tear resistance, different tear expansion and different further tearing resistance. As the weak point, the composite glass pane contains the plastic with the lower tear resistance, the lower tear expansion and the lower further tearing resistance and, in the region which does not represent the weak point, the plastic with the higher tear resistance, the higher tear expansion and the higher further tearing resistance. Furthermore, there are points in the composite glass pane without any polymer intermediate layer, at which grains of a material are provided whose hardness is higher than that of the glass that is used. These grains are intended to penetrate into the surface of the prestressed glass pane when necessary, and destroy it.

When a composite pane is used as a windscreen or roof pane in a vehicle, its rupture resistance may be disadvantageous when a pedestrian, an in-line skater or a bicycle rider is thrown against the composite pane in the event of an accident. Furthermore, windscreens normally have external convex curvature. This shape results in a relatively high intrinsic strength, so that the glass does not break until higher forces have been applied than in the case of planar panes or panes with concave curvature. Since, in the event of an accident, a person is normally first of all hit by the bumper bar or the engine bonnet on the lower extremities and is thrown upwards, the head frequently strikes the windscreen, which may result in very severe injuries.

Solutions are admittedly known for protection of people when vehicles collide, but these relate to measures for providing energy-absorbent materials on the engine bonnet (DE 100 37 628 A1) or of raising the engine bonnet in the event of an accident with a person, in order to advantageously influence the impact dynamics (DE 101 32 950 A1). A measure for protection of people which relates indirectly to the windscreen is known from Laid-Open Specification DE 198 03 165 A1, which describes a safety device for a motor vehicle in which an airbag covers a frame around the windscreen on the outer surface of the motor vehicle after it has been unfolded.

The object of the present invention is to provide a composite pane for vehicles which provides better absorption for the energy of an object striking its surface.

According to the invention, this object is achieved by the features of the independent claim(s). The features of the dependent claims indicate advantageous developments of this subject matter.

The composite pane is thus a conventional laminate composed of a number of rigid panes, which are connected to one another with the aid of a tear-resistant intermediate layer which is used as an adhesive layer and is in each case arranged between them. At least one of the rigid panes is composed of glass which, according to the invention, is provided with one or more weak points. If a pane breaks as a result of an object striking the laminate, at least the glass pane then breaks while, in contrast, the intermediate layer remains intact as a cohesive layer or film. The weak points are arranged and are incorporated in the glass pane such that the breakage of the glass pane, and possibly of further panes, does not allow the object striking it to pass through. The opening which was closed by the composite pane is thus not opened up. The breakage of the glass pane and possibly of further panes results in the stiffness of the composite pane being reduced. If the object is a human body, this leads to a considerable proportion of the impact energy being absorbed when the person collides with the composite pane, or being dissipated by the breakage of the rigid pane and subsequent elastic or even plastic expansion of the intermediate layer. In certain cases, specifically when one of the further panes is composed of a relatively thin plastic, this plastic pane can likewise absorb impact energy by elastic or plastic deformation. After the impact, the individual panes are still connected to one another, so that on the one hand the vehicle opening in which the composite pane is used is still closed and, on the other hand, the human body is decelerated by the composite pane being more flexible as a result of the pane breaking.

This safety-net effect is admittedly also observed even with conventional composite glass panes, although the lack of weak points means that this is considerably more random than the effect which is achieved deliberately by the invention, and occurs at points that are not locally defined.

Furthermore, these composite panes offer the resistance of the unweakened strength of the normal float glass panes against breakage.

A further aspect of the method of operation of the composite pane according to the invention is also that its edge remains firmly connected to the frame of the mounting opening. The composite pane does not penetrate completely into the vehicle interior, but is supported on the said frame while the energy is being dissipated.

The weak points which have been mentioned are produced by weakening the glass pane, for example by means of mechanically stretching the glass pane. According to the invention, however, the weakening of the glass pane is preferably reduced by the introduction of a locally limited stress gradient, that is to say of an inhomogeneous stress state in the glass, which deliberately reduces the fracture strength of the glass in a locally restricted area. The stress gradient is provided not only over the thickness of the glass but also over the glass surface. If loaded beyond a specific extent, for example as a result of bending of the glass pane, the strength in the area of the voltage gradient is exceeded, and the glass pane breaks.

A locally limited inhomogeneous stress state can be produced by applying a stoving enamel and by stoving it at increased temperatures. If the coefficient of expansion of the stoving enamel differs sufficiently from that of the glass pane, differences of more than 30% have been found to be expedient, this results in sufficiently high stress inhomogeneities during the cooling down of the glass/enamel composite, leading to the desired effect. This method for production of the stress gradient is preferred since it is associated with relatively little manufacturing complexity. Furthermore, composite panes for vehicles are frequently provided with frame-like printing composed of stoving enamel, so that the stoving enamel to achieve the stress gradient and the stoving enamel for the frame-like printing can be printed on in successive operations, and-can then be stoved jointly.

However, a locally limited stress gradient can also be introduced by local heating of the glass pane above the transformation temperature, and then by cooling it down rapidly. This method is widely used as thermal prestressing although, with the known methods, the entire pane is heated and cooled down homogeneously. Local heating can be achieved, for example, with the aid of a laser or of a gas flame.

In order to ensure that the broken glass pane does not penetrate through the intermediate layer after the pane has broken, that is to say that the laminate still closes the opening, the weak points can be arranged offset with respect to one another like a grid. This avoids the glass pane breaking along an elongated line, which could then form a cutting edge and could cut through the intermediate layer. The distance between the individual weak points and the size of the weak points may be between 0.1 mm and 200 mm depending on the nature and the form of their arrangement.

If the weak points are arranged in the edge area of the composite pane, any optical adverse effects which may occur and are caused by the production of the stress gradient or by the different optical characteristics of the areas with and without internal stresses are scarcely perceptible since they are located away from the main viewing area. If required, weak points located in the edge area can be covered without any major effort by the frame-like enamel there with which motor vehicle windows are frequently provided.

The weak points are preferably applied to that surface of the glass pane which faces the interior. Since the curvature of the composite pane points outwards, application of force from the interior of the vehicle will not result in the glass pane breaking, because this produces a compressive stress close to the surface on that surface of the glass pane which faces the interior. As is known, compressive stresses can, however, be absorbed well by glass. When loaded from the inside, the composite pane according to the invention thus behaves scarcely any differently from a conventional composite pane. However, if the force is applied from the outside, tensile stresses are produced close to the surface on the surface of the glass pane facing the interior, which lead to the glass pane breaking as a result of the weakening produced by the weak points. However, the stress inhomogeneities should be designed such that forces which act on the installed (in particular bonded-in) composite pane as a result, for example, of bodywork deformation during normal operation cannot lead to the composite pane breaking.

The composite pane according to the invention is formed from a glass pane and one or more glass or plastic panes. The individual panes are connected to one another with the aid of a tear-resistant intermediate layer. The intermediate layer may, for example, be an adhesive film composed of polyvinyl butyral or polyurethane. The intermediate layer itself may also be in the form of a laminate formed from a functional layer and an adhesive layer.

The invention claimed is:

1. A composite pane for closing a vehicle opening, comprising:
   at least one glass pane;
   at least one further pane;
   an intermediate layer which connects the at least one glass pane and the at least one further pane to one another; and
   a plurality of weak points included in the at least one glass pane, arranged offset with respect to one another in a grid so as to prevent breaking alone an elongated line,
   wherein the glass pane is configured such that, in an event of an object striking the composite pane, the glass pane breaks at the plurality of weak points, but the composite pane is configured to keep the vehicle opening closed at least by deforming the intermediate layer of the composite pane.

2. A composite pane according to claim 1, wherein the plurality of weak points are locally limited inhomogeneous stress states introduced into the glass pane.

3. A composite pane according to claim 2, wherein the inhomogeneous stressed states are achieved by printing on and then stoving a stoving enamel.

4. A composite pane according to claim 2, wherein the inhomogeneous stressed states are produced by local thermal prestressing.

5. A composite pane according to claim 4, wherein the thermal prestressing is produced by local heating with a gas flame followed by sudden cooling down.

6. A composite pane according to claim 4, wherein the thermal prestressing is produced by local heating with a laser, followed by sudden cooling down.

7. A composite pane according to claim 1, wherein the plurality of weak points are arranged in an edge area of the composite pane.

8. A composite pane according to claim 1, wherein the at least one further pane is composed of glass.

9. A composite pane according to claim 8, wherein a plurality of weak points are also introduced into the at least one further glass pane.

10. A composite pane according to claim 1, wherein the intermediate layer which connects the at least one glass pane and the at least one further pane to one another comprises a thermoplastic adhesive sheet.

11. A composite pane according to claim 1, wherein the plurality of weak points are arranged on a side of the glass pane that faces away from a side on which the object strikes.

12. A composite pane according to claim 1, configured as a windscreen or roof pane in a vehicle.

13. A composite pane according to claim 1, wherein a distance between each weak point is between 0.1 mm and 200 mm.

* * * * *